UNITED STATES PATENT OFFICE

EDWIN C. WHITE, OF BALTIMORE, MARYLAND, ASSIGNOR TO HYNSON, WESTCOTT AND DUNNING, INC., A CORPORATION OF MARYLAND

MERCURY DERIVATIVES OF DI-HALOGENATED RESORCIN-SACCHAREINS

No Drawing.   Application filed December 29, 1930.   Serial No. 505,469.

This invention relates to certain new mercury derivatives of di-halogenated resorcin-sacchareins having antiseptic properties. They have most probably the following formula:

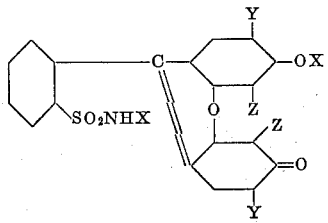

in which X stands for hydrogen or an alkali metal such as sodium; Y stands for halogen and Z stands for hydrogen or a radical consisting of mercury and a negative element or group such as $CH_3COO$, $OH$, or $Cl$, depending upon the compound of mercury used in the mercurating operation, at least one Z being such a radical. Aside from the fact that the compounds may contain either one or two mercury-containing radicals, it is noted that they may exist as free acids in which both X's stand for hydrogen, or as mono-alkali metal salts in which case only the X of the amino group represents an alkali metal, or as di-alkali metal salts in which case both X's represent alkali metal.

A soluble salt of mercury, such as the acetate or the chloride, or mercuric oxide preferably in the freshly precipitated condition, may be used in the preparation of these substances, as will appear in the examples.

Example 1.—3.1 grams (1/200 gram molecule) of di-iodo resorcin saccharein are dissolved in the minimum amount of normal sodium hydroxide solution, and the resulting solution diluted to about 100 cc. A filtered solution of 1.6 grams (1/200 gram molecule) of mercuric acetate in 25 cc. of water, acidified with acetic acid, is added slowly with vigorous stirring. A red precipitate forms. The mixture is stirred and boiled for from one half to two hours, until a sample does not blacken with ammonium sulphide. The precipitate is then separated by filtration or centrifugalization, well washed and dried. It may be converted to a soluble form by grinding it with water to a fine suspension, and adding drop by drop with stirring a solution of a caustic alkali, such as sodium hydroxide or ammonium hydroxide, until dissolved. This solution is then evaporated to dryness, either by exposure to the air in thin layers or in vacuuo at a moderate temperature.

In place of the mercuric acetate 1.35 gram of mercuric chloride, or 1/200 gram-molecule of any other soluble mercury salt, may be used, the procedure being otherwise the same. Moreover, twice this amount, or 1/100 gram-molecule, of a soluble mercury salt, may be used to form a di-mercury derivative. Again if it is desired to carry the mercuration beyond the stage of a mono-mercury derivative, the alkali metal salt of the di-halogenated resorcin-saccharein may advantageously be treated with an excess of a mercury salt, as follows:

Example 2.—2.6 grams of dibrom-resorcin-saccharein are dissolved in a minimum amount of normal sodium hydroxide solution, the resulting solution diluted to 50 cc. and gradually added to a boiling solution of 20 grams of mercuric chloride in 60 cc. of water. Replacing the water lost by boiling, the mixture is boiled for from 3 to 4 hours; the precipitate is separated and repeatedly washed by filtration or centrifugalization until free of soluble mercury salt, and dried. This product is then converted to a soluble alkali metal salt as described in Example 1.

Example 3.—6.2 grams (1/100 gram-molecule) of di-iodo resorcin saccharein are dissolved in 10 cc. of normal sodium hydroxide solution and about 100 cc. of water, and 2.16 grams of freshly precipitated mercuric oxide are added. The mixture is boiled and stirred until the oxide is dissolved and the solution is then evaporated to dryness as in Example 1. The product thus formed will be essentially the mono-sodium salt of the mono-hydroxy mercury derivative of the di-iodo resorcin saccharein. The procedure may be varied so as to use 20 cc. of normal sodium hydroxide solution, in which case the corresponding di-sodium salt will be formed. Also, twice the specified amount of mercuric oxide may be used to form a di-mercury derivative.

In any of the above examples the particular di-halogenated resorcin saccharein specified may be replaced by the molecular equivalent of any other di-halogenated resorcin-saccharein to obtain the corresponding mercury derivative thereof. It is thought probable that when mercuric acetate or mercuric oxide is used in the mercurating operation, the negative group attached to the mercury will be the OH group, or that an inner anhydride of such hydroxy-mercury compound is formed. Such an anhydride would, however, be expected to regenerate the hydroxy group when dissolved in caustic alkali. It is also thought probable that when mercuric chloride is used, chloro-mercury compounds are formed, i. e., the negative group will be Cl.

The precise conditions set forth in the above examples can, of course, be considerably varied without departing from the spirit of the invention.

In the appended claims the term "mercury derivatives," unless modified or limited, is intended to include mono- and di-mercurated products, and also the variations in the negative group attached to the mercury brought about by variations in the mercuration process, as above described.

I claim:—

1. Mercury derivatives of dihalogenated resorcin-sacchareins.
2. Mono-mercury derivatives of di-halogenated resorcin-sacchareins.
3. Water-soluble alkali metal salts of mercury derivatives of di-halogenated resorcin-sacchareins.
4. Water-soluble alkali metal salts of mono-mercury derivatives of di-halogenated resorcin-sacchareins.
5. Mercury derivatives of di-iodo resorcin-saccharein.
6. Mono-mercury derivatives of di-iodo resorcin-saccharein.
7. Water-soluble alkali metal salts of mercury derivatives of di-iodo resorcin-saccharein.
8. Water-soluble alkali metal salts of mono-mercury derivatives of di-iodo resorcin-saccharein.
9. Mono-hydroxy-mercury derivatives of di-halogenated resorcin-sacchareins.
10. Alkali metal salts of mono-hydroxy-mercury derivatives of di-halogenated resorcin-sacchareins.
11. The mono-hydroxy-mercury derivative of di-iodo resorcin saccharein.
12. Water-soluble alkali metal salts of the mono-hydroxy-mercury derivative of di-iodo resorcin-saccharein.
13. The product of the action of a soluble mercury salt on a soluble salt of a di-halogenated resorcin-saccharein.
14. The product of the action of a soluble mercury salt on a soluble salt of di-iodo resorcin-saccharein.
15. The product of the action of mercuric oxide on a soluble salt of a di-halogenated resorcin-saccharein.
16. The product of the action of mercuric oxide on a soluble salt of di-iodo resorcin saccharein.

In testimony whereof, I affix my signature.

EDWIN C. WHITE.